(12) United States Patent
Balakrishnan

(10) Patent No.: US 9,411,612 B2
(45) Date of Patent: Aug. 9, 2016

(54) TECHNIQUES FOR CREATING AND/OR MAINTAINING SCALABLE HETEROGENEOUS READ-ONLY FEDERATIONS OF REGISTRIES

(71) Applicant: Software AG, Darmstadt (DE)

(72) Inventor: Balaji Balakrishnan, Chennai (IN)

(73) Assignee: SOFTWARE AG, Darmstadt (DE)

( * ) Notice: Subject to any disclaimer, the term of this patent is extended or adjusted under 35 U.S.C. 154(b) by 241 days.

(21) Appl. No.: 14/078,017

(22) Filed: Nov. 12, 2013

(65) Prior Publication Data

US 2015/0134763 A1 May 14, 2015

(51) Int. Cl.
- *G06F 15/16* (2006.01)
- *G06F 9/445* (2006.01)
- *H04L 29/08* (2006.01)

(52) U.S. Cl.
CPC .............. *G06F 9/44505* (2013.01); *H04L 67/02* (2013.01)

(58) Field of Classification Search
CPC ...................................................... H04L 41/04
USPC ................................................. 709/208, 230
See application file for complete search history.

(56) References Cited

U.S. PATENT DOCUMENTS

| | | | |
|---|---|---|---|
| 7,200,674 B2* | 4/2007 | Sapuram | G06Q 10/10 709/238 |
| 8,285,672 B2 | 10/2012 | Wells et al. | |
| 8,856,344 B2* | 10/2014 | Gould | H04L 41/5041 707/609 |
| 2002/0146018 A1* | 10/2002 | Kailamaki | H04L 12/2602 370/401 |
| 2005/0086330 A1* | 4/2005 | Perham | H04L 67/306 709/220 |
| 2005/0132060 A1* | 6/2005 | Mo | H04L 51/12 709/227 |
| 2011/0208806 A1 | 8/2011 | Pechanec et al. | |
| 2012/0016891 A1 | 1/2012 | Pechanec et al. | |
| 2014/0059226 A1* | 2/2014 | Messerli | G06F 9/5072 709/226 |

FOREIGN PATENT DOCUMENTS

WO    2012/125354    9/2012

OTHER PUBLICATIONS

Discovery of Web Services in a Federated Registery Environment, Kaarthik Sivashanmugam, University of Gorgia, 2004.*

(Continued)

*Primary Examiner* — David Lazaro
*Assistant Examiner* — Marie Georges Henry
(74) *Attorney, Agent, or Firm* — Nixon & Vanderhye PC

(57) ABSTRACT

Certain example embodiments described herein relate to techniques for creating and maintaining scalable heterogeneous read-only federations of registries, e.g., for use in service-oriented architectures. Federation of heterogeneous registries can be achieved with any types of registries (e.g., UDDI, ebXML, OSGi, ESB, proprietary, etc.), while at the same time avoiding the need to have target registries implement extra protocols or layers. In certain example embodiments, gateway registries may implement translation layers appropriate for the types of registries thereunder so as to provide a scalable and flexible solution. Optionally, registries may be grouped based on type so that messages may be translated only once per group, while avoiding tight couplings with registries and the services they provide.

28 Claims, 7 Drawing Sheets

(56) References Cited

OTHER PUBLICATIONS

Thomi Pilioura et al., "PYRAMID-S: A Scalable Infrastructure for Semantic Web Service Publication and Discovery," Proceedings of the 14$^{th}$ International Workshop on Research Issues on Data Engineering: Web Servies for E-Commerce and E-Government Applications, copyright 2004, pp. 1-8. http://cgi.di.uoa.gr/~atsalga/OC3_RIDE_2004.pdf.

Kaarthik Sivashanmugam et al., "Discovery of Web Services in a Federated Registry Environment," retrieved Nov. 12, 2013, pp. 1-9. http://lsdis.cs.uga.edu/lib/download/MWSDI-ICWS04-final.pdf.

Thomi Pilioura et al., "Seamless Federation of Heterogeneous Service Registries," retrieved Nov. 12, 2013, pp. 1-10. http://cgi.di.uoa.gr/~afrodite/C19_EC-Web_2004.pdf.

Wikipedia—Service Oriented Architecture (SOA), retrieved Nov. 12, 2013, pp. 1-12. http://en.wikipedia.org/wiki/Service-oriented_architecture.

Wikipedia—Metadata Registry, retrieved Nov. 12, 2013, pp. 1-4. http://en.wikipedia.org/wiki/Metadata_registry.

MSDN Architecture Center, The Architecture Journal—Service Registry: A Key Piece for Enhancing Reuse in SOA, Sep. 2009, pp. 1-7. http://msdn.microsoft.com/en-us/architecture/aa699419.aspx.

Wikipedia—Universal Description Discovery and Integration, retrieved Nov. 12, 2013, pp. 1-3. http://en.wikipedia.org/wiki/UDDI.

Wikipedia—Electronic Business Using eXtensible Markup Language (ebXML), retrieved Nov. 12, 2013, pp. 1-3. http://en.wikipedia.org/wiki/EbXML.

Wikipedia—OSGI, retrieved Nov. 12, 2013, pp. 1-9. http://en.wikipedia.org/wiki/OSGi.

Wikipedia—Enterprise Service Bus, retrieved Nov. 12, 2013, pp. 1-5. http://en.wikipedia.org/wiki/Enterprise_service_bus.

Wikipedia—Basic Access Authentication, retrieved Nov. 12, 2013, pp. 1-2. http://en.wikipedia.org/wiki/Basic_access_authentication.

CentraSite—FAQs, retrieved Nov. 12, 2013, pp. 1-2. http://www.centrasite.com/faq.html.

IBM—DeveloperWorks, "SSL Client Authentication: It's a Matter of Trust," retrieved Nov. 12, 2013, pp. 1-5. http://www.ibm.com/developerworks/lotus/library/ls-SSL_client_authentication/.

IPInfoDB—Free IP Address Geolocation Tools, retrieved Nov. 12, 2013, pp. 1-3 http://ipinfodb.com/.

\* cited by examiner

TECHNIQUES FOR CREATING AND/OR MAINTAINING SCALABLE HETEROGENEOUS READ-ONLY FEDERATIONS OF REGISTRIES

TECHNICAL FIELD

Certain example embodiments described herein relate to registries used in service-oriented architectures. More particularly, certain example embodiments described herein relate to techniques for creating and maintaining scalable heterogeneous read-only federations of registries.

BACKGROUND AND SUMMARY OF EXAMPLE EMBODIMENTS OF THE INVENTION

"Reuse" of services is one of the key benefits of provided by a service-oriented architecture (SOA). A service registry oftentimes is thought of as one of the fundamental entities of a SOA involved in enabling such reuse. Conventionally, the "registry" in a SOA is the place where all metadata or data information about services is maintained within an organization or group of organizations. Standard registries include, for example, UDDI (Universal Discovery Description and Integration), ebXML (Electronic Business using eXtensible Markup Language), and the like. In general, and more broadly speaking, anything that maintains "services" can be called a registry. For example, the Open Service Gateway Initiative (OSGi) has its own service registry for services running within an OSGi container.

Organizations oftentimes will want to combine multiple registries. For example, companies may be confronted with the problem of how to combine multiple registries when, for example, they have merged with other companies and the specific resources are managed in their own separate registries. Another example of when an organization might want to combine multiple registries relates to SOA adaptation, e.g., when two or more departments in a given organization want to combine their services through one registry.

Registry federation is the process of combining a group of registries such that when any one registry is accessed, the services related to any of them can be returned. Registry federation thus may in some instances help address the above-described and/or other challenges oftentimes faced by different companies. UDDI and some other current registries provide mechanisms that enable federation. Such conventional mechanisms generally rely on there being a homogeneous environment in which all of the registries essentially "talk" to using the same protocol.

Unfortunately, however, heterogeneity is something that oftentimes cannot be avoided in the real world. Heterogeneity in computer systems and/or registries can be caused by any number of different factors. Such factors may include some or all of the following and/or other scenarios:

1. A company acquires another company and cannot standardize using one registry as part of the merger, at least in the short-term;
2. SOA adaption is carried out at the department level rather than at the company level and, as a result, different solutions have been chosen because of the requirements being focused on a specific department or a specific few departments, rather than all departments within a company;
3. A company wants to amalgamate its registry with those of its partners to provide a single view of the services that are be provided;
4. A company wants to host a public registry over different types of registries; and/or
5. A company wants to facilitate reuse by merging standard registries like UDDI, ebXML, etc., with other registries like OSGi, ESB (Enterprise Service Bus), a home-grown registry, etc., potentially within a single view.

Registry federation typically is accomplished in one of two ways, e.g., as shown in FIGS. 1 and 2. According to a first approach, e.g., as shown in FIG. 1, when a user makes a request from a client device 102a, 102b, or 102c, the request is sent to all registries 104a, 104b, 104c, . . . , 104n, participating in federation via a gateway registry 106. The result from each registry 104a, 104b, 104c, . . . , 104n, is consolidated at the gateway registry 106 and ultimately is sent back to the user.

According to a second approach, e.g., as shown in FIG. 2, a so-called master gateway registry 206 pulls the services/assets from the federated registries 104a, 104b, 104c, . . . , 104n, and saves a link or a copy of the services in the master gateway registry 206. This pre-fetched data is served when a user makes a request from a client device 102a, 102b, or 102c.

Although these approaches may be successfully implemented in some scenarios, further enhancements are still desirable. For instance, conventional approaches generally involve a common language (such as UDDI) or ontology. Referring to FIG. 1, for example, the implementation of a common language such as UDDI, for example, would involve the registry gateway being a UDDI gateway and would rely on each participant using the UDDI protocol, even if the individual participants are not registries of that type. This arrangement is shown, for example, in FIG. 3, where a client 102a communicates with the registries 104a and 104b through the UDDI gateway registry 106, which generates UDDI requests that are processed through UDDI protocol layers 108a and 108b respectively provided to the registries 104a and 104b. It is noted that a UDDI protocol layer 104b is provided for the registry 104b, even though that registry is an ebXML registry. It thus will be appreciated that complexity is introduced as more and more registries are added, especially if more and more registries of more and more different types are provided. It also might not be feasible in all instances to provide a UDDI layer to the individual registries, e.g., if one or more public registries are involved, if a user does not have control over all registries, etc.

Conventional approaches also tend to have issues with scalability and/or performance, e.g., because potentially massive amounts of data may need to be pre-fetched and stored. Although the storage concern might be alleviated in part when links to actual services are stored, a tight coupling between the gateway registry and the actual services in the various registries is created, which can be problematic in some instances. For instances, the tight coupling may be problematic in public registries where registries can join and leave federation at potentially any time and for potentially any reason.

Thus, it will be appreciated that there is a need in the art for improved federating registries in a service-oriented architecture environment.

One aspect of certain example embodiments relates to techniques enabling heterogeneous registries (including ActiveDirectory, UDDI, ebXML, OSGi, ESB, and/or other different registry types) to federate via a scalable real-time mechanism.

Another aspect of certain example embodiments involves a network topology in which a translation protocol layer is moved into a gateway registry, which aids in providing a scalable heterogeneous federation of registries. In other words, certain example embodiments advantageously are able to unite multiple, heterogeneous registries using a gateway and translation technique.

Another aspect of certain example embodiments involves enabling heterogeneous registries (including ActiveDirectory, UDDI, ebXML, OSGi, ESB, and/or other different registry types) to be handled in a generic way, at least from the client perspective. Certain example embodiments thus may advantageously provide an interface enabling registry type independent querying, while also insulating the clients from code changes even when a change to a registry is mandated, when a new registry or the same or different type is added, etc.

Still another aspect of certain example embodiments involves the definition of an intermediate layer in which queries are translated for each specific registry type.

In certain example embodiments, a method of maintaining a federation of target registries is provided. The target registries are separated from at least one client device via a master gateway registry (that optionally includes a plurality of translation modules) hosted on a computer system including a processor and a memory. A request for a service from the at least one client device is received at the master gateway registry, with the request being in a first format. The request is translated into translated requests of one or more second formats, with the one or more second formats being different from the first format and being selected so as to match protocols natively supported by the target registries. The translated requests are electronically transmitted to the target registries. In response to the electronic transmission to the target registries, responses are received from the target registries in the one or more second formats. The responses from the one or more second formats are translated into translated responses in the first format. The translated responses are electronically transmitted from the master gateway registry to the at least one client device.

According to certain example embodiments, the at least one client device is permitted to contact the target registries only indirectly and through the master gateway registry, and vice versa.

According to certain example embodiments, translations are performed at the master gateway registry using the processor of the computer system. And additionally, or in the alternative, according to certain example embodiments, translations may be performed in accordance with configured mappings as between the first format and the one or more second formats, with the mappings being stored to a non-transitory computer readable storage medium accessible by the master gateway registry. Translations may be performable as between formats supporting, for example, ActiveDirectory, UDDI, ebXML, OSGi, ESB, webservice, proprietary protocols, and/or the like. For instance, translations from UDDI protocol based messages to SOAP messages for webservice protocol support may be selectively generated, and vice versa.

According to certain example embodiments, the target registries are accessible through at least two slave gateway registries that each is in communication with the master gateway registry. The at least two slave gateway registries are arranged hierarchically, e.g., in successive tiers.

In certain example embodiments, there is provided a method of maintaining a federation of target registries, with the target registries being separated from at least one client device via a master gateway registry. A request to add a new target registry to the federation is received. Parameters of services offered by the new registry that are to be exposed to the at least one client device are identified. The identified parameters are mapped to corresponding parameters exposed through the master gateway registry. The mapping provides instructions as to how messages in a first format for a first protocol usable by the at least one client device are to be translated into corresponding messages in a second format for a second protocol usable by the new target registry, and vice versa. The first and second formats and/or the first and second protocols are different from one another. The mapping is stored to a non-transitory computer readable storage medium. The new registry is deployed in a group of registries based on one or more characteristics associated with the new registry. The newly deployed registry is enabled and so may begin accepting requests from and serving replies to the at least one client device, through the master gateway registry, in connection with the mapping.

In certain example embodiments, there are provided non-transitory computer readable storage mediums tangibly storing instructions that, when executed by at least one processor of a system, perform the above-described and/or other methods.

Similarly, in certain example embodiments, a computer system including a processor, a memory, and a non-transitory computer readable medium, is configured to execute computer functions for accomplishing the above-described and/or other methods. For instance, in certain example embodiments, a computer system including a processor, a memory, and a non-transitory computer readable medium, may host a master gateway registry configured to at least perform the above-described and/or other methods.

These aspects and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1:
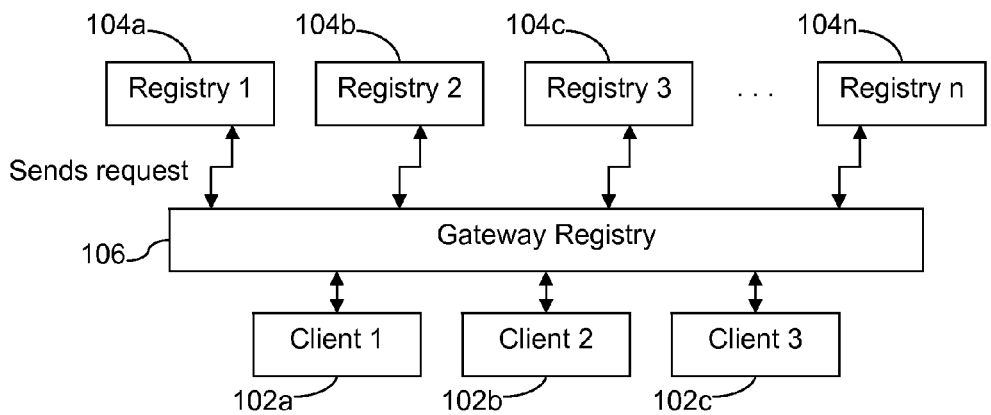
FIG. 1 is a block diagram illustrating a first conventional approach for providing registry federation.
Figure 2:
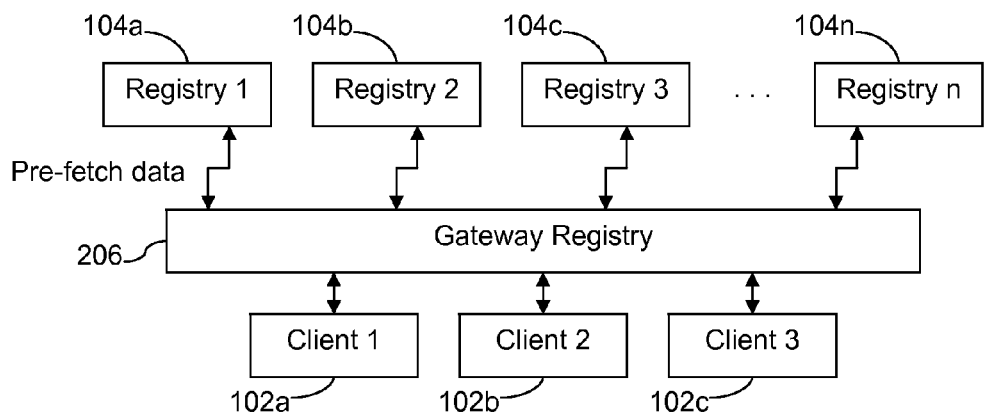
FIG. 2 is a block diagram illustrating a second conventional approach for providing registry federation.
Figure 3:
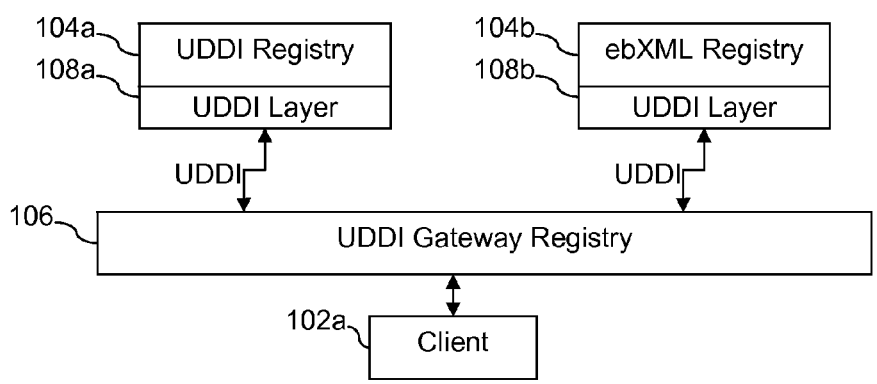
FIG. 3 is a variant of the FIG. 1 block diagram, in which UDDI is implemented as a common protocol as between the gateway registry and the individual registries.
Figure 4:
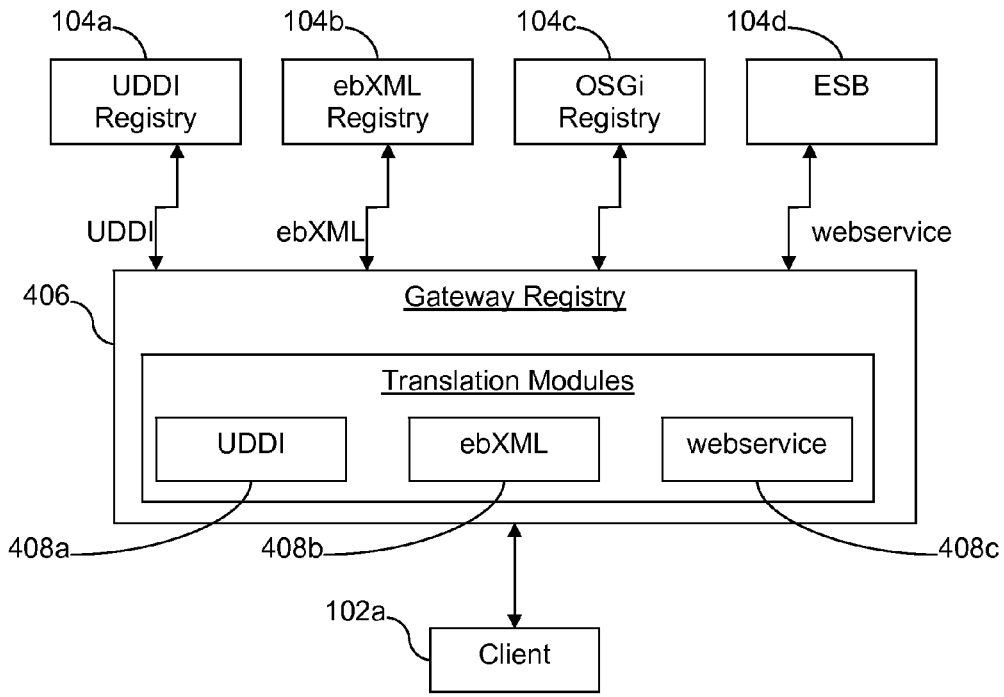
FIG. 4 is a block diagram illustrating a registry federation in accordance with certain example embodiments.

Certain example embodiments involve a network topology in which the translation protocol layer is provided in a gateway registry so as to enable the implementation of a scalable heterogeneous federation of registries. In other words, certain example embodiments advantageously are able to unite multiple, heterogeneous registries using a gateway and translation technique. In this regard, FIG. 4 shows an example network topology in accordance with certain example embodiments. As shown in FIG. 4, the gateway registry 406 provides a mechanism that translates a given search request originating with a client 102a into the protocol understood by the target registry 104a-d, regardless of whether the registry is a UDDI, ebXML, JAXR, OSGi, ESB, or other registry. For instance, translation modules 408a, 408b, and 408c are provided for translating requests from the registries client 102a. The translation modules may in some cases add integration logic where necessary, e.g., to cover cases where the target registry has limited search functionality (such as, for example, where the target registry does not have any or has only limited filtering capabilities), etc.

Advantages of this approach may include, for example, the absence of a need for the target registries to each implement one or more different federation protocols, e.g., from what they might natively support; the possibility of a consistent mapping between all registries of a particular type; the "lowest common denominator" being mitigated with regard to search capabilities, e.g., such that a richer set of searches may be selectively performed using a more complete range of search capabilities as supported by each registry, as opposed to more basic searches that would work for all registries; etc.

Certain example embodiments may group registries based on the protocol(s) that they support. For example, all registries that support UDDI can be grouped together. Another group could host all ebXML registries. Hierarchies of gateways may additionally or alternatively be provided, e.g., if the number of registries exceeds a certain threshold.

Clients may communicate with "master gateway registries" whose job it is to delegate the clients' requests to slave gateway registries, if such slave gateways are provided. The communication between master and slave gateways can be mediated by any suitable protocol (e.g., proprietary, webservice, and/or other protocols). In the example that follows, the webservice protocol is used for communication between master and slave gateway registries, although other protocols may be used in different example embodiments.

When both master and slave gateway registries are provided, slave gateway registries may be the units that perform the translation based on the registry type(s) that they support. Similarly, registry providers may connect to master gateway registries and provide configuration details required for registry communication. The master gateway registry may place the registries in available slots in the hierarchy. Clients thus may be insulated from slave gateway registries such that direct communication between the clients and the slave gateway registries is not possible in certain example embodiments. The master and slave gateway registries may share parent-child relationships, e.g., with the slaves potentially sharing the same relationships with other slaves higher up in the hierarchy. The master gateway registries may maintain the next empty slot for each registry type so that a new registry can be placed in the right slot in the hierarchy when it is introduced into the system. Based on a preferred protocol, registry type, and/or the like, a new registry may be added to the right group of target registries. This arrangement helps ensure that messages will be translated only once per group and that there is no tight coupling between registries. A target registry thus may be ready to serve requests.

Each group can set its own maximum size (e.g., 25 registries), and/or group size may be set globally (e.g., at the same or different level). If the number of registries in a group exceeds that maximum size, the group may be reconfigured such that it has one slave gateway registry, with the remainder being target registries. Any remaining target registries that do not fit may be assigned to a new gateway registry. Slave gateway registries thus may help to route and translate the request. In this way, the target registries are free to connect to and disconnect from the federation. This approach advantageously offers good scaling in a distributed environment.

Figure 5:
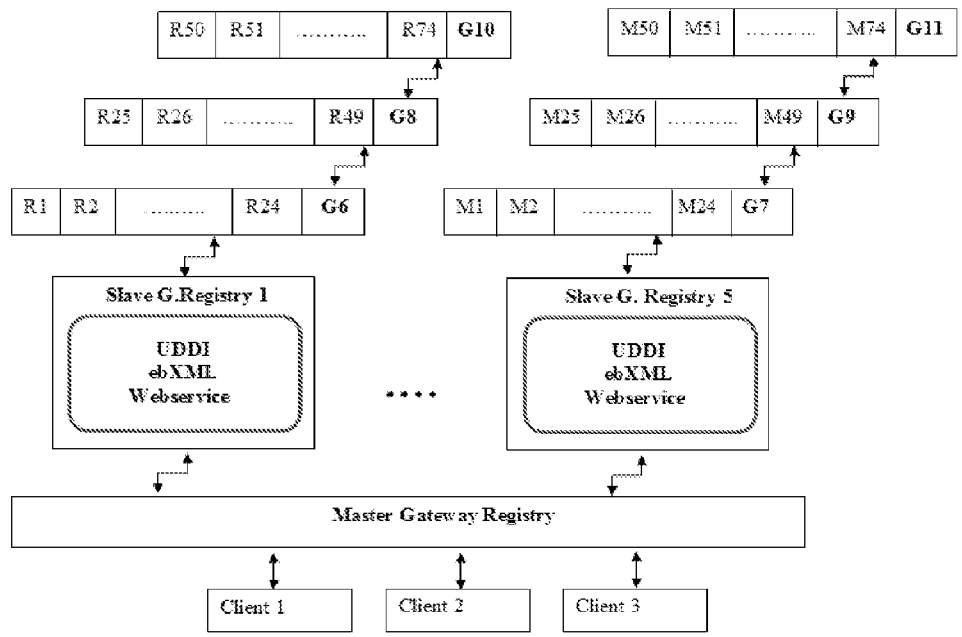
FIG. 5 is a block diagram with an illustrative hierarchical grouped registry federation that may be set up using the techniques of certain example embodiments.

FIG. 5 is a block diagram with an illustrative hierarchical grouped registry federation that may be set up using the techniques of certain example embodiments. In the FIG. 5 example, all "R" entries are UDDI registries, and all "M" entries are ebXML registries. A master gateway registry is provided and feeds into five top-level slave gateway registries, two of which are shown. Each of the two illustrated top-level slave gateway registries supports translation for UDDI, ebXML, and webservice protocols. As can be seen from FIG. 5, the maximum group size is set to 25. Thus, at each level, 24 target registries are provided, and one registry gateway in each level, designated with a "G" and a number, leads to a further slave gateway registry level. It also will be appreciated from FIG. 5 that although each of the top-level slave gateway registries supports both UDDI and ebXML protocols, the UDDI and ebXML registries are grouped together in different top-level slave gateway registries.

When a request is made by a client, the master gateway registry will send the request to all slave gateway registries simultaneously and wait for responses. The slave gateway registries will translate the requests that they receive from the master gateway as appropriate and, in turn, send the translated requests to all of the registries thereunder simultaneously and wait for responses. Those responses may be translated back, as appropriate, and relayed to the requesting client through the master gateway registry.

To improve the availability of slave gateway registries, master gateway registries may in certain example embodiments allow standby operations to be configured, e.g., such that requests are queued when a primary slave node at a given level is not available. In addition, or in the alternative, master node availability can be improved by having more instances behind a load balancer, e.g., with a shared cache to save all configuration information.

In the heterogeneous registries federation of certain example embodiments, users oftentimes will only need to read service information. Furthermore, in some use cases (e.g., such as, for example, public registries of potentially many existing registries, federation of partner registries, etc.), allowing write operations may pose some security concerns. As a result, certain example embodiments may provide read-only functionality.

It is noted that certain example embodiments may involve computer systems (e.g., including at least one processor, a memory, non-transitory storage media, and/or other processing resources) hosting and/or otherwise backing the master and/or slave gateway registries.

Example Implementation

Details will now be provided for an example implementation. It will be appreciated, however, that this implementation second partner has a proprietary registry. Assume further that a manufacturer is hosting the federation, including the master gateway registry, and is providing details to the partners. Assume the master gateway registry provides a web-based registration application.

In order to configure the federation in accordance with certain example embodiments, the registries may be registered in the federation. The configuration information will vary, however, between types of registries. For example, consider the following parameters, their meanings, and how they are to be handled in UDDI and other protocols:

| Name | Meaning | UDDI | Others |
|---|---|---|---|
| EndPoint URL | URL where the request will be sent. This will be "Enquiry URL" in UDDI case | Mandatory | Mandatory |
| UserId/Password | If the URL is protected with "Basic Authentication", server will challenge the request for userID/Password | Optional | Optional |
| Client Certificate | If HTTPs protocol is used for EndPoint, server will challenge for "Client Authentication" | Optional | Optional |
| Proxy Server URL | Proxy server through which requests are supposed to be sent | Optional | Optional |
| UserId/Password for Proxy Server | If the proxy URL is protected with "Basic Authentication", server will challenge the request | Optional | Optional |
| Client Certificate for Proxy Server | If HTTPs protocol is used for proxy server, server challenges for "Client Authentication" | Optional | Optional |
| Timeout in sec | Wait for this much time before terminating the connection if the server is not reachable. | Optional (default is 30 sec) | Optional (default is 30 sec) |
| Follow Redirects | If the EndPoint URL redirects to another URL, follow that as well | Optional (default is false) | Optional (default is false) |
| HTTP Headers | These headers will be sent with request as if user has sent them, with key: value format with comma separation for multiple values | Optional | Optional |
| UDDI Version | Version 2 or 3 | Optional (default is version 3) | N/A |
| Constraints Filter | Provider might want to limit the search results. This constraint will be sent along with the request. An example is the classification to which search results belong. | Optional | N/A |
| SecurityURL | UDDI has a concept called "auth token". If security is enabled, all UDDI requests should send the "auth token" along with request as <authInfo>auth token</authInfo> | Optional | N/A |
| UserId/Password | If the SecurityURL is protected with "Basic Authentcation", server will challenge the request | Optional | NA | is exemplary and should not be seen as limiting the scope of the invention unless specifically claimed. For example, although a search service and related parameters are contemplated, it will be appreciated that the example techniques described herein may be used in connection with a wide variety of services involving a broad range of possible parameters. By way of example and without limitation, services that may be supported include, for instance, weather, traffic, general processing, and/or other (potentially simpler or more complex) services.

For simplicity in this illustration, assume that there are two partners. The first partner has a UDDI based registry, and the For standard registries, mappings between the search parameters that the master gateway registry exposes to end users may be already available. This might not be true in all cases including, for example, mappings involving proprietary protocols, webservices, and/or the like. The generic nature of webservices, for example, might sometimes present challenges for developing mappings when new registries are to be added. Certain example embodiments may, however, provide approaches for dealing with mappings where generic protocols such as webservices are involved. For instance one or more of the following and/or other approaches may be used for generating mappings where webservices are involved:

Option 1: The master gateway registry accepts as an optional parameter a URL where one or more WSDL documents reside. The master gateway registry parses the WSDL documents and lists the operations and its parameters. The provider can then map these parameters with search parameters of and/or available through the master gateway registry.

Option 2: The search parameters are exposed as a WSDL document. Target registries can then implement a webservice using the WSDL document that the master gateway registry exposes.

Option 3: The provider may write a translation module and plug it into the registries so that it knows how exactly the request is to be translated. In this regard, and as alluded to above, the translation modules of certain example embodiments may convert requests into formats that the target registries can understand. Gateway registries in certain example embodiments may implement the translation module for every type of registry. Assume, for example, that there is a type of registry that needs to be added to a federation that supports only a proprietary "binary" or "black box" protocol (such as, for example, RMI, which is a difficult to understand "binary" protocol that is different from, for example, text-based protocols such as XML). In this hypothetical scenario, there would be a need to write a translation module. A translation module once written could be easily plugged into the registries if a proper interface is suitably exposed. It is noted that the translation modules may include software modules that themselves include executable logic related directly to the mappings, software modules that read and use WSDL documents or other stored mapping files, etc.

It is noted that mapping files may be stored to a non-transitory computer readable storage medium in certain example embodiments. The non-transitory computer readable storage medium that stores such mapping files may be accessibly by the master gateway registry, the slave gateway registries, etc., but may not be accessible by the target registries and/or the end user devices in certain example embodiments.

Once all configuration information is provided, the provider can trigger an automatic registration of a new registry within the system. During this registration process for the new registry, the master gateway server may determine where to place the new registry (e.g., the exact group and/or hierarchy), e.g., based on the new registry's type. As a part of this determination, if the slot where the new target registry should be provided is already filled or otherwise unusable (e.g., because the maximum group size is already met and would be exceeded by providing the new registry in that group, if loads would become unbalanced, etc.), the master gateway registry may provision a slave gateway registry and add the new target registry to the new slave gateway registry.

Once the slave gateway registry is ready to be made operational, the master gateway registry may hand over the configuration information to it. The slave gateway registry may in certain example embodiments maintain the configuration information of all target registries associated with it.

Figure 6:
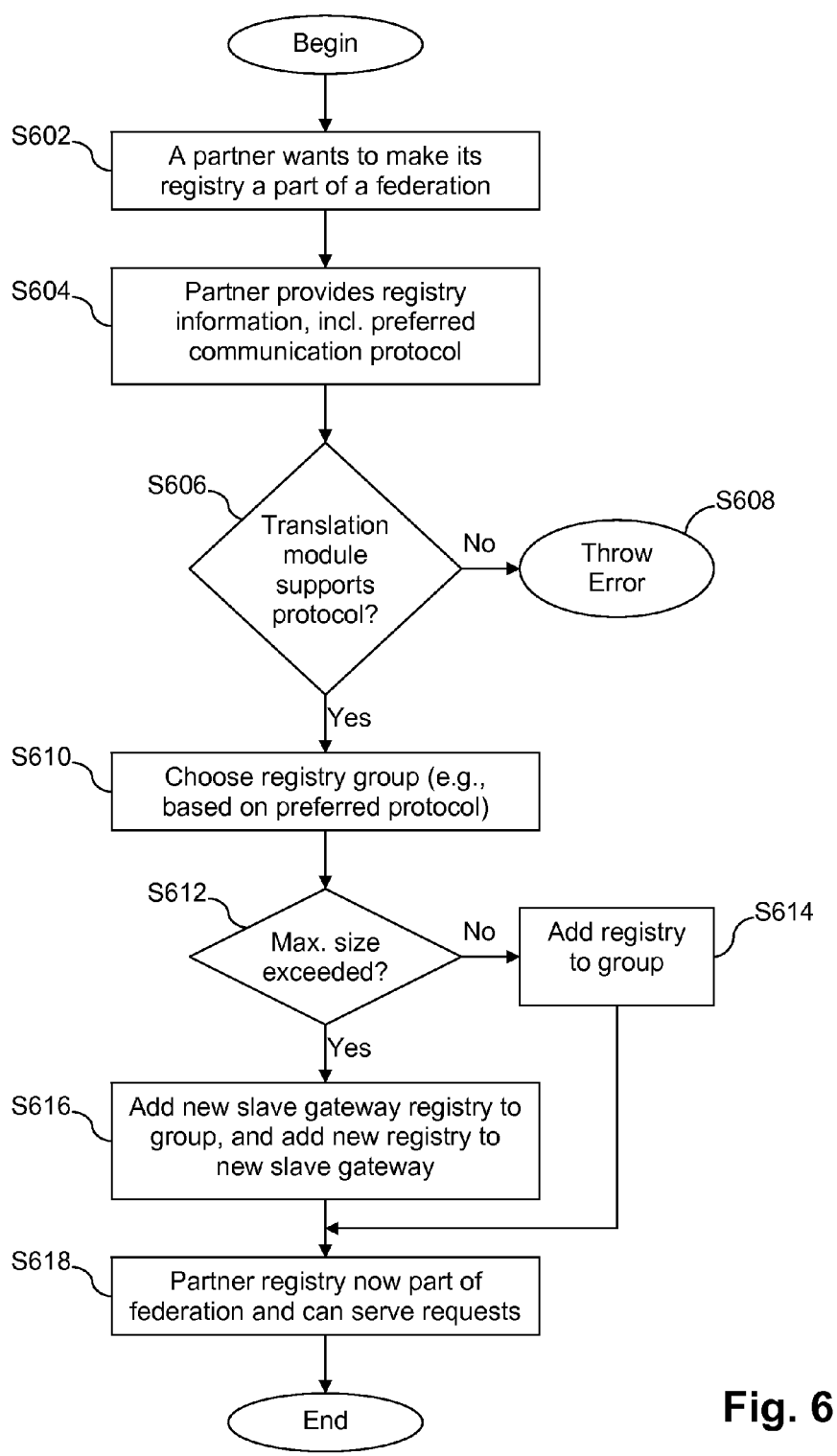
FIG. 6 is a flowchart providing an overview of an illustrative registry registration process, in accordance with certain example embodiments.

FIG. 6 is a flowchart providing an overview of an illustrative registry registration process, in accordance with certain example embodiments. As shown in FIG. 6, the process begins in step S602 when a partner decides that it wants its registry to be made a part of the federation. The partner provides registry information, including the preferred communication protocol (e.g., UDDI, ebXML, webservice, etc.), e.g., to the master gateway registry, in step S604. If there is no translation module that supports the protocol as determined in step S606, then an error may be thrown in step S608. Alternatively, or in addition, a message may be sent to the master gateway registry provider and/or the partner providing the registry indicating that a new translation module should be specified and deployed. In certain example embodiments, the registry registration process may be interrupted and data needed to provide a translation module may be gathered at this time. As shown in the FIG. 6 example flowchart, the process might end at this point. Alternatively, the registry registration process may be allowed to continue with the at least apparent need for a new translation module being highlighted for potential later follow-up by the appropriate party.

Referring once again to what is shown in FIG. 6, if there is a translation module that supports the protocol as determined in step S606, then in step S610 a registry group is selected based on the preferred protocol for the new registry that is being added.

A check is performed in step S612 to determine whether addition to the selected group would cause the maximum group size to be exceeded. If this is not the case, then the new registry is simply added to the slave gateway registry as appropriate in step S614. If, however, the addition to the selected group would cause the maximum group size to be exceeded as determined in step S612, then in step S616 a new slave gateway registry is added to the selected group and the new registry is added to the new slave gateway registry. Load balancing optionally may be performed as a part of this overall process. Once the registry is added (e.g., in step S614 or in step S616), as indicated in step S618 the partner registry is considered a part of the federation and can serve requests.

An example SOAP request that may be sent to a slave gateway registry (e.g., in step S614 or in step S616 of FIG. 6) to register the new registry may be as follows:

```
<SOAP-ENV:Envelope xmlns:SOAP-ENV=
"http://schemas.xmlsoap.org/soap/envelope/"
SOAP-ENV:encodingStyle="http://schemas.xmlsoap.org/soap/encoding/">
  <SOAP-ENV:Body>
    <m:addRegistry xmlns:m="http://www.sag.com/gatewayservice">
      <m:config>
        <m:param key="type">UDDK/m:param>
        <m:param key="securityyurl">
          http://myhost:4545/security</m:keyword></m:param>
        <m:param key="suserid>tokenmanager</m:param>
        <m:param key="spassword>tadmin</m:param>
        <m:param key="enquiryurl>
```

```
        http://myhost:4545/uddienquiry</m:param>
      <m:param key="version>3</m:param>
      <m:param key="userid>admin</m:param>
      <m:param key="password>manager</m:param>
    </m:config>
  </m:addRegistry>
 </SOAP-ENV:Body>
</SOAP-ENV:Envelope>
```

Figure 7:
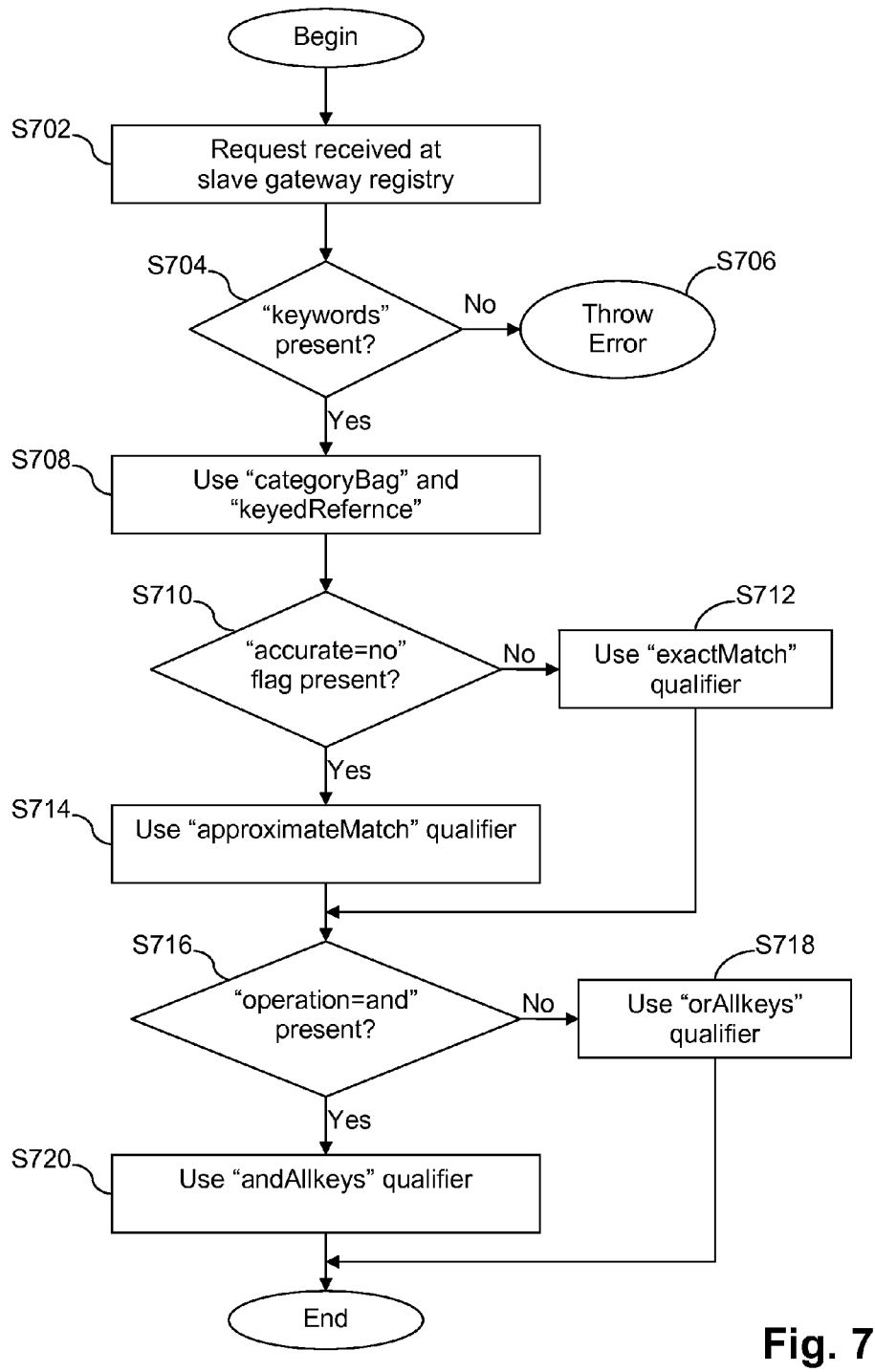
FIG. 7 is a flowchart showing an illustrative process for translating requests in accordance with certain example embodiments.

A description of what happens when a request is made will now be provided, e.g., in connection with FIG. 7, which is a flowchart showing an illustrative process for translating requests in accordance with certain example embodiments. For the purposes of this example, the FIG. 7 flowchart is provided for serving UDDI target registries with requests. In general, an end-user logs in to the master gateway registry and provides search criteria. The login operation may be accomplished using a software- or web-based user interface provided by the master gateway registry, and/or the like. In certain example embodiments, login operations may be automatically performed, e.g., when a user attempts to access a service directly or indirectly. The master gateway registry sends the request to all slave gateway registries simultaneously and waits for response.

When the request comes in, the translation module in the slave gateway registry translates the request to the appropriate protocols and sends those requests to all registries in the group simultaneously, e.g., as indicated in step S702 in FIG. 7. If there is a gateway server in a given group, the request (potentially in its un-translated state) is forwarded to further and further tiers in the hierarchy, e.g., until all target registries in all tiers receive the request.

Assume for the purposes of this example that keywords are categorized using the "uddi:uddi.org:categorization:general_keywords" standard categorization, and an ESB exposes a webservice. It is noted that the keyword categorization may be provided as configuration information during the registry registration process. Assume further that the user wants to see all of the services that deal with "population statistics," e.g., using a search with the keywords "statistics" and "population" and with the constraints that both of the keywords should be present and that the results need not be an accurate or exact match.

The following SOAP message may be the request message that is sent form the master gateway registry to the slave gateway registry (or slave gateway registries):

```
<SOAP-ENV:Envelope xmlns:SOAP-ENV=
  "http://schemas.xmlsoap.org/soap/envelope/"
  SOAP-ENV:encodingStyle="http://schemas.xmlsoap.org/soap/encoding/">
 <SOAP-ENV:Header>
    <requestID xmlns="http://www.sag.com/headers"
      SOAP-ENV:mustUnderstand="1">147325674</requestID>
    <responseEndpoint xmlns="http://www.sag.com/headers"
      SOAP-ENV:mustUnderstand="1">
        http://www.sag.com/gatewayservice/search
    </responseEndpoint>
 </SOAP-ENV:Header>
 <SOAP-ENV:Body>
    <m:GetServicesByKeyword xmlns:m=
      "http://www.sag.com/gatewayservice">
      <m:keywords>
         <m:keyword>population</m:keyword>
         <m:keyword>statistics</m:keyword>
      </m:keywords>
      <m:operation>AND</m:operation>
      <m:accurate>no</m:accurate>
      <m:config>
         <m:param key="resultcount">25</m:param>
      </m:config>
    </m:GetServicesByKeyword>
 </SOAP-ENV:Body>
</SOAP-ENV:Envelope>
```

When the gateway registry receives this request, if it "deals in" UDDI, then the translation module will convert the user request to the example request format below:

```
<find_service businessKey="*" xmlns="urn:uddi-org:api_v3">
    <authInfo>auth token</authInfo>
    <findQualifiers>
        <findQualifier>
            uddi:uddi.org:findqualifier:approximateMatch
        </findQualifier>
        <findQualifier>
            uddi:uddi.org:findqualifier:caseinsensitivematch
        </findQualifier>
        <findQualifier>
            uddi:uddi.org:findqualifier:andallkeys
        </findQualifier>
    </findQualifiers>
    <categoryBag>
        <keyedReference keyValue="population" keyName=
            "General:keywords" tModelKey=
            "uddi:uddi.org:categorization:general_keywords"/>
        <keyedReference keyValue="statistics" keyName=
            "General:keywords" tModelKey=
            "uddi:uddi.org:categorization:general_keywords"/>
```

-continued

```
    </categoryBag>
    <name>%</name>
</find_service>
```

In terms of the FIG. 7 example flowchart, step S704 checks to see whether there are keywords present in the request. If not, an error is thrown in step S706. If, however, there are one or more keywords present, the categoryBag and keyedReference UDDI properties are used as indicated in step S708. As shown above, keyedReference tags within the categoryBag tag specify the keys "population" and "statistics" in accordance with these requests. A determination is made in step S710 as to whether the request requires accurate or exact matches of the keywords in the results, and this determination may take into account a default value for this property (which may in certain example embodiments be configured as "no"). If there is no "accurate=no" or an "accurate=yes" tag provided in the request, then the exactMatch UDDI qualifier is used as indicated in step S712. If there is an "accurate=no" tag provided in the request or if no such tag is present and the default is to be used, then an approximateMatch UDDI qualifier is instead used as indicated in step S714. In this example, the approximateMatch qualifier is used because the user initially specified that there does not need to be an accurate match.

A determination is made in step S716 as to whether the request requires all of the keywords to be present in the results, and this determination may take into account a default value for this property (which may in certain example embodiments be configured to indicate that all of the keywords should be present). If there is no "operation=and" or "operation=or" tag provided in the request, then the orAllkeys UDDI qualifier is used as indicated in step S718. If there is an "operation=and" tag provided in the request or if no such tag is present and the default is to be used, then an andAllkeys UDDI qualifier is instead used as indicated in step S720. In this example, the andAllkeys qualifier is used because the user initially specified that the results should include both search terms.

Additional other tests may be made in the translation in this and/or other examples, e.g., depending on the source and/or destination protocol(s), and potentially based on the initial configuration.

When the gateway registry receives the UDDI request immediately above, and if it "deals with" a proprietary registry, then the translation module will convert the request to a suitable webservice request assuming, of course, that the provider or some other party has generated a WSDL document and appropriately mapped the operations and request parameters so that a translation can occur. An example SOAP message that may be generated is as follows:

```
<SOAP-ENV:Envelope xmlns:SOAP-ENV=
  "http://schemas.xmlsoap.org/soap/envelope/"
  SOAP-ENV:encodingStyle="http://schemas.xmlsoap.org/soap/encoding/">
  <SOAP-ENV:Body>
    <x:GetServices xmlns:x="http://www.mankind.com/services">
      <x:criteria>
        <x:keyword>population</m:keyword>
        <x:keyword>statistics</m:keyword>
      </x:criteria>
      <x:operation>AND</m:operation>
      <x:strict>no</m:strict>
    </x:GetServices>
  </SOAP-ENV:Body>
</SOAP-ENV:Envelope>
```

A slave gateway registry will send the translated request to all target registries simultaneously. In certain example embodiments, it will not wait for the results from all target registries before taking further actions. Instead, in certain example embodiments, as soon as the slave gateway registry receives the response from a given target registry, it will convert the response to the format the master gateway registry can understand and send the results to the endpoint mentioned in the request, possibly also with a requestID. Based on the requestID, the master gateway registry can consolidate the results and show them to the end user. This may help end-customers receive results quickly, potentially allowing them to monitor results as they come in. An example response from the UDDI target registry is as follows:

```
<?xml version="1.0" encoding="utf-8"?>
<soapenv:Envelope xmlns:soapenv=
  "http://schemas.xmlsoap.org/soap/envelope/"
  xmlns:xsd="http://www.w3.org/2001/XMLSchema"
  xmlns:si="http://www.w3.org/2001/XMLSchema-instance">
  <soapenv:Body>
    <serviceList xmlns="urn:uddi-org:api_v3">
      <listDescription>
        <includeCount>2</includeCount>
        <actualCount>2</actualCount>
        <listHead>1</listHead>
      </listDescription>
      <serviceInfos>
        <serviceInfo
          businessKey="uddi:207ff1cc-25c5-544c-415c-5d98ea91060c"
          serviceKey="uddi:207ff1cc-25c5-544c-415c-
5d98ea91060c:service_worldpopulation">
          <name xml:lang="en-US">
            World Population Service
          </name>
        </serviceInfo>
        <serviceInfo
          businessKey="uddi:207ff1cc-25c5-544c-415c-5d98ea91060c"
          serviceKey="uddi:207ff1cc-25c5-544c-415c-
5d98ea91060c:service_population">
          <name xml:lang="en-US">
            Population statistics service
          </name>
        </serviceInfo>
      </serviceInfos>
    </serviceList>
  </soapenv:Body>
</soapenv:Envelope>
```

Translation would normalize the response and send the example message below to the master gateway registry in the format master gateway registry can understand:

```
<SOAP-ENV:Envelope
  xmlns:SOAP-ENV="http://schemas.xmlsoap.org/soap/envelope/"
  SOAP-ENV:encodingstyle="http://schemas.xmlsoap.org/soap/encoding/">
<SOAP-ENV:Header>
   <requestID xmlns="http://www.sag.com/headers"
      SOAP-ENV:mustUnderstand="1">147325674</requestID>
</SOAP-ENV:Header>
<SOAP-ENV:Body>
   <m:searchResponse xmlns:m="http://www.sag.com/gatewayservice">
      <m:result>
         <m:name>World Population Service</m:name>
         <m:desc>Service to get population details</m:desc>
         <m:contact xmlns:x=
           "http://www.sag.com/gatewayservice/contact">
            <x:name>Sam</m:name>
            <x:number>+91 9656785645</m:number>
            <x:address>120, North cart street, Chennai,
              India</m:address>
            <x:website>www.worldpopulation.com</m:website>
         </m:contact>
         <m:metaurl>
          http://www.worldpopulation.com/services/
          populationdetails?WSDL
         </m:metaurl>
         <m:extras>
            <m:param>
               <m:name>service usage details</m:name>
               <m:value>
                 http://www.worldpopulation.com/services/usage
               </m:value>
            </m:param>
            <m:param>
               <m:name>service usage details in French</m:name>
               <m:value>
                 http://www.worldpopulation.com/services/usage_fr
               </m:value>
            </m:param>
         </m:extras>
      </m:result>
      <m:result>
         <m:name>Population statistics service</m:name>
         <m:desc>
            Service to get population statistics of India
         </m:desc>
         <m:contact xmlns:x=
           "http://www.sag.com/gatewayservice/contact">
            <x:name>Gokul</m:name>
            <x:number>+91 9795031321</m:number>
            <x:address>57, SPS 3rd Street, Royapettah, Chennai,
              India</m:address>
            <x:website>www.indiapopulation.com</m:website>
         </m:contact>
         <m:metaurl>
          http://www.indiapopulation.com/services/indiapopulation?WSDL
         </m:metaurl>
      </m:result>
   </m:searchResponse>
</SOAP-ENV:Body>
</SOAP-ENV:Envelope>
```

It will be appreciated that it sometimes may happen that the translation module has to make multiple requests to get the information that it desires. For example, in the case of UDDI, the "find_service" call will be followed by the "get_Service-Detail" call.

The master gateway registry may allow for a response mapping. For non-standard types of registries, for example, a target registry response can be mapped to a format that the master gateway registry expects. This mapping can be used by a translation module to translate the response when it sends the same to the master gateway registry.

Some information might not be available. For example, there might not be any contact person for services hosted in ESB. In those cases, the relevant parameters may be left blank. If more than standard information is to be passed, the "m:extras" construct (e.g., as mentioned in the example response above) or the like can be used.

Result consolidation at the master and slave target registries can be influenced by user preferences. User preference might include, for example, including and/or excluding registries that are hosted in specific countries or cities, number of results per page (which may, in turn, influence how fast the user can see the result, such that more wait time will be required for higher counts, etc.), and/or the like.

It will be appreciated that some sites already offer services to find the location of a registry based on IP. For example, the IPInfoDB services available from http://ipinfodb.com may offer city and country precision for a given IP. In particular, city precision can be obtained using:
http://api.ipinfodb.com/v3/ip-city/
?key=<api_key>&ip=74.125.45.100
and country precision can be obtained using:

> http://api.ipinfodb.com/v3/ip-
> country/?key=<api_key>&ip=74.125.45.100.

Figure 8:
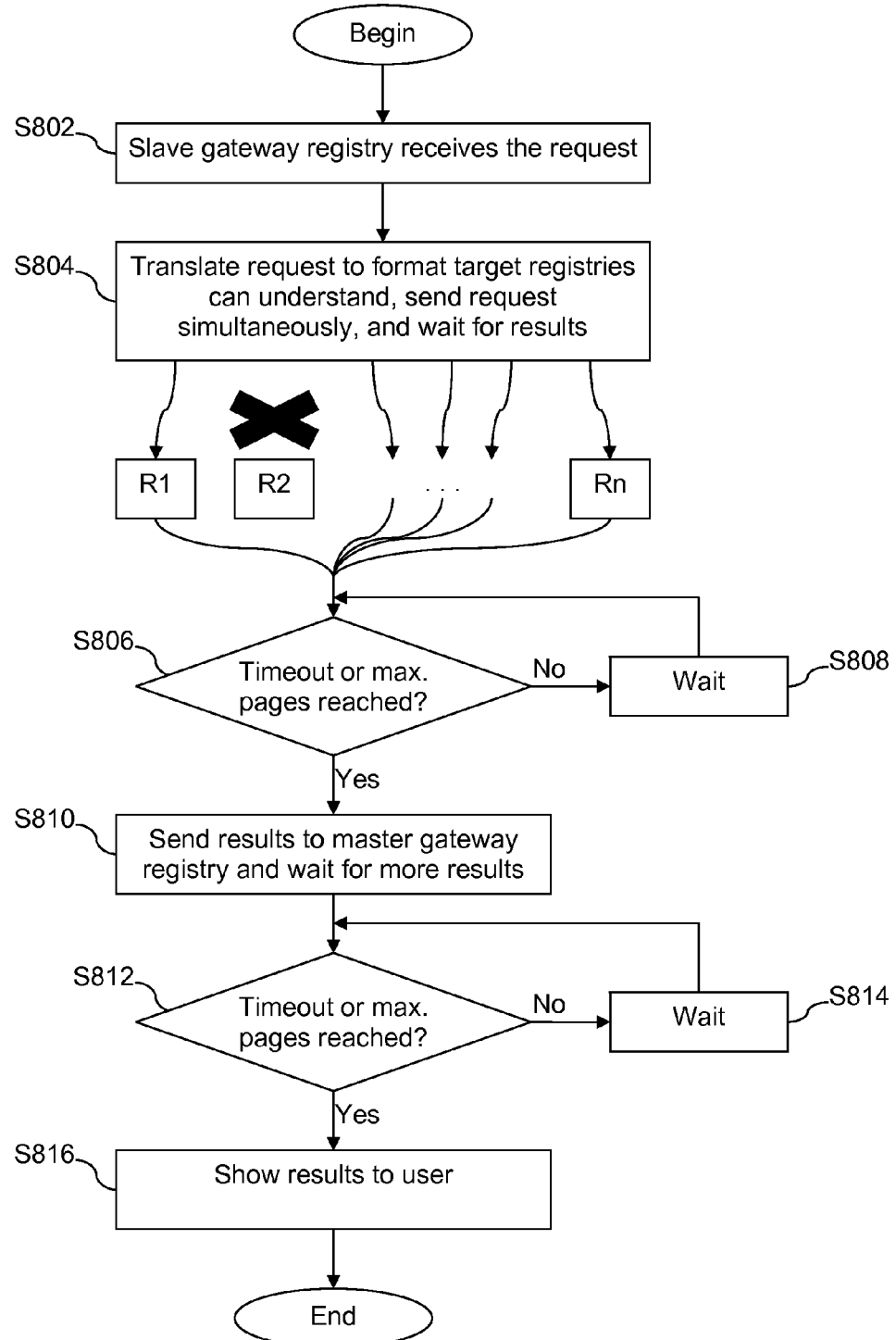
FIG. 8 is a flowchart showing an illustrative process that may be used in sending results to a requesting client device, in accordance with certain example embodiments.

FIG. 8 is a flowchart showing an illustrative process that may be used in sending results to a requesting client device, in accordance with certain example embodiments. In step S802, a slave gateway registry receives a request, e.g., from an end-user via a master gateway registry. In step S804, the request is translated to a format that the target registries can understand, and the slave gateway registry simultaneously sends the translated requests, and waits for results back from the individual target registries. As shown in FIG. 8, the request may be forwarded to all registries in the set of registries R1, R2, . . . , that meet a specified criteria. For instance, a registry might be excluded, e.g., if it is hosted in a country in which the user is not interested. The scenario is represented by the "X" by registry R2 in FIG. 8.

The registries may send results back to the slave gateway registry. If a timeout or the maximum number of responses is not reached as determined in step S806, the process waits for an additional amount of time (which may be user specified in certain example embodiments), e.g., as indicated in step S808. On the other hand, if a timeout is not reached and/or the maximum number of responses is reached as determined in step S806, then the results may be sent to the master gateway registry in step S810. Steps S812 and S814 are similar to steps S806 and step S808 and, in essence, allow for more results to stream in. Results may be sent to the master gateway again (e.g., similar to as described in step S810). In certain example embodiments, this waiting process may be repeated until all registries that have been queried return results, until a predetermined maximum period of time has elapsed, etc. Eventually, however, the results will be shown to the user, e.g., as indicated in step S816.

There might be cases where there will be many results for the same criteria. In such situations, the slave and/or master gateway registry may not, and/or may be unable to, filter the results. This might be preferable in some cases, e.g., where a user might want to further narrow results based on some additional parameters. In such cases, the user might be informed that there are too many results, and the user may be prompted to provide one or more additional parameters in order to choose the right service. For instance, in a manufacturing context, price per unit and/or the like may be provided as additional criteria.

Case 2: In some scenarios, a user might skip the current result set, even though the search is still active in other registries that have yet to send the results to master gateway registry. In such instances, when a user switches the search context, the master gateway registry may send a "cancel" request to the slave gateway registries. The cancel request may include a cancel command, a requestID associated with the initial request, a timestamp (e.g., to be sure that the proper request is being cancelled by checking, for instance, whether the timestamp associated with the cancel request is later than the timestamp associated with the requestID, etc.). The slave gateway registries may stop sending the results for that particular requestID. Even if the slave gateway registries send results that are already on their way, the master gateway registry may simply discard the result.

An example cancellation request is as follows:

```
<SOAP-ENV:Envelope xmlns:SOAP-ENV=
 "http://schemas.xmlsoap.org/soap/envelope/"
 SOAP-ENV:encodingStyle="http://schemas.xmlsoap.org/soap/encoding/">
  <SOAP-ENV:Body>
    <x:cancelSearch xmlns:x="http://www.sag.com/gatewayservice">
      <x:requestID>147325674</m:requestID>
    </x:cancelSearch>
  </SOAP-ENV:Body>
</SOAP-ENV:Envelope>
```

Figure 9:
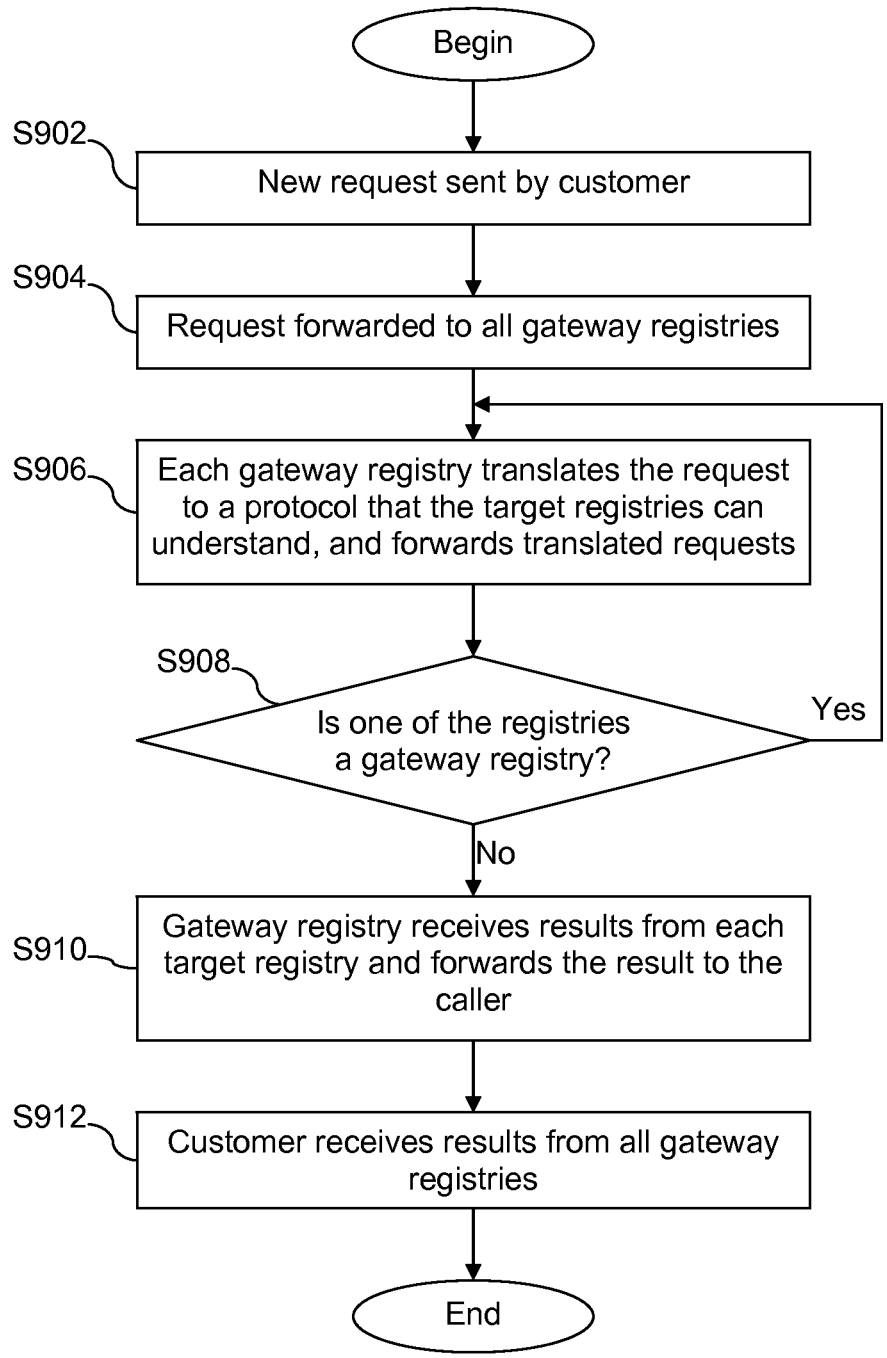
FIG. 9 is a flowchart showing another illustrative process that may be used in sending results to a requesting client device, in accordance with certain example embodiments.

If the content has to be localized, for example, the gateway server can be used to even translate the content apart from protocol translation. The target registry can mention the preferred language while joining the federation and this can be used to translate the content. FIG. 9 is a flowchart showing another illustrative process that may be used in sending results to a requesting client device, in accordance with certain example embodiments. As shown in FIG. 9, in step S902, a new request is sent by a customer and received by a master gateway registry. The master gateway registry may forward that request to all gateway registries in step S904. Each gateway registry then translates the request to a protocol that the target registries can understand and forwards the translated requests to all target registries in step S906. If one of those target registries happens to be a gateway registry, e.g., as determined in step S908, then the process in essence returns to step S906 for the higher level slave as the other target registries in that level proceed to process the request. In step S910, then gateway registry receives results from each target registry and forwards the result to the caller (whether that be a slave gateway registry between the target and the master gateway registry, or the master gateway registry itself). In step S912, the customer receives the results back from all gateway registries, via the master gateway registry.

Figure 10:
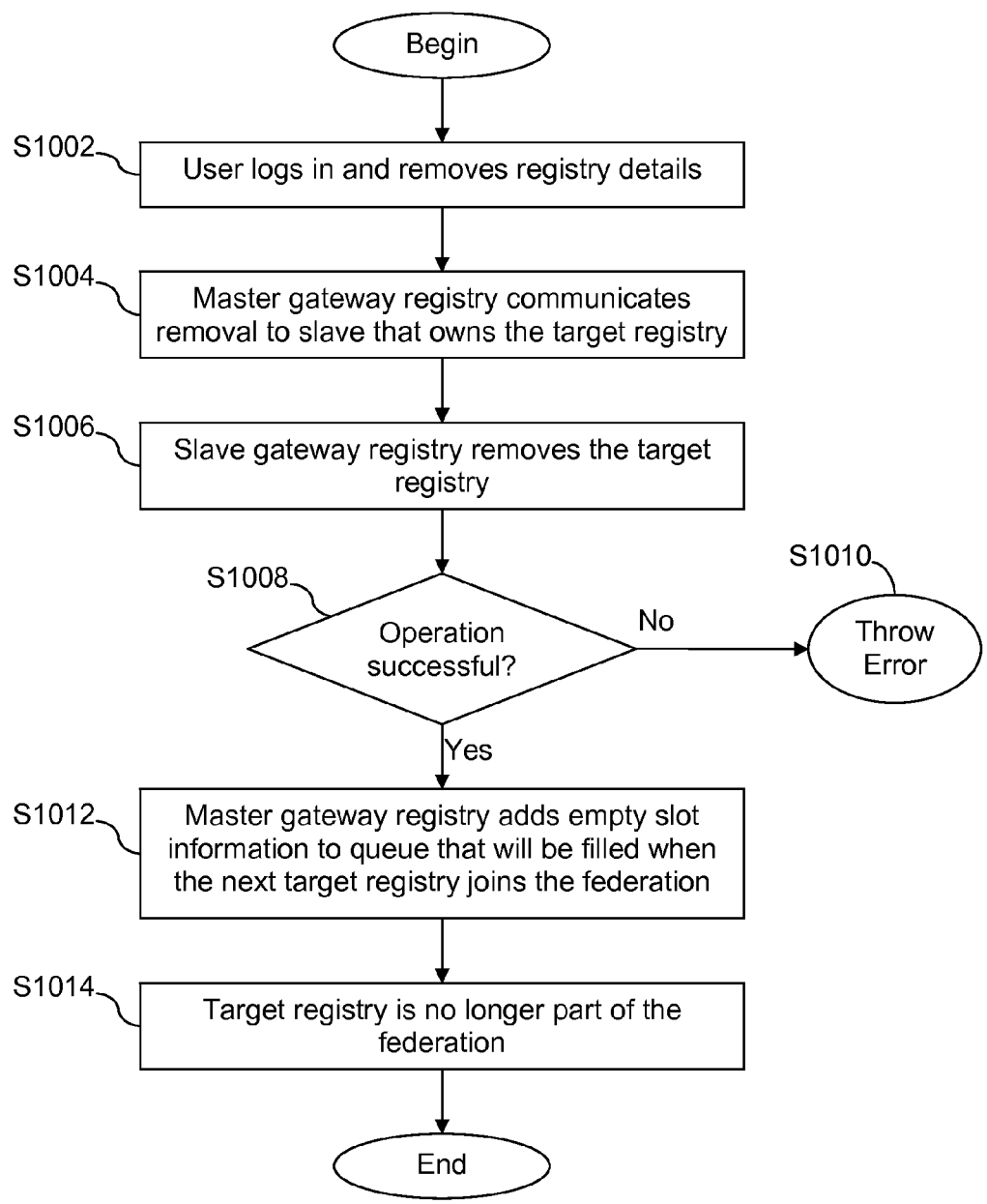
FIG. 10 is a flowchart showing an illustrative process that may be used in removing a registry from the federation, in accordance with certain example embodiments.

Suppose one of the registries is to be removed from federation, e.g., because the owner of the registry wants to remove it from a public federation, because a transition period is ended and services have been migrated to a new platform, etc. FIG. 10 is a flowchart showing an illustrative process that may be used in removing a registry from the federation, in accordance with certain example embodiments. As shown in FIG. 10, in step S1002, a user logs into the master gateway registry and deletes the target registry details. The master gateway registry communicates the removal to the slave gateway registry that owns the target registry in step S1004. The slave gateway registry attempts to remove the target registry details in step S1006. If the removal operation is unsuccessful as determined in step S1008 (e.g., in a situation where the registry is active when the delete process is initiated, if the requesting user lacks authorization for the removal, etc.), then an error is thrown in step S1010. On the other hand, if the operation is deemed successful in step S1008, the empty slot where the removed registry used to be will be filled when a new registry joins the federation. That is, the master gateway registry adds the newly empty slot information to a queue that will be filled when the next target registry joins the federation in step S1012, and the target registry is no longer part of the federation as indicated in step S1014. Optionally, load balancing may be performed, levels may be collapsed, and/or the like.

Example Applications

As indicated above, heterogeneity in computer systems and/or registries can be caused by any number of different factors, but certain example embodiments may help addressing the needs implicated in these scenarios. Consider first a scenario in which a company acquires another company and cannot standardize on one registry in the short-term as part of the merge. A heterogeneous read-only federation would mean that the company could take advantage of the SOA assets provided by the merger with a reduced set of migration efforts in a short timeframe. SOA adaption may be carried out at the department level rather than the company level and, therefore, different solutions may be chosen because the requirements can be focused on the department rather than all departments within the company. Although unification in the SOA landscape has been problematic in these situations, e.g., because the costs of unification and sovereignty concerns can stand in the way, the heterogeneous federation approach of certain example embodiments may help all sides ease into a unified world without having to agree to a specific global change all at the same time.

Consider next a scenario in which a company wants to amalgamate its registry with those of its partners, e.g., to provide a single view of the services that are to be provided. Assume, for example, that a manufacturer has a private registry to maintain details about its suppliers and partners. In a situation where its suppliers are not able to meet its demand, the manufacturer may be forced to seek out new suppliers in order to meet demand. The manufacturer might approach partners for references about the other suppliers. Certain example embodiments may be advantageous in such situations, e.g., as heterogeneous read-only federation of registries may allow manufacturers and partners to share their data without compromising security.

Certain example embodiments also might be useful in scenarios where companies want to facilitate reuse by merging standard registries (e.g., UDDI based registries) with other registries (e.g., proprietary, ESB, and/or the like). For instance, before the advent of ESB and SOA, banks oftentimes had to develop their own registries (which oftentimes were relational databases) to maintain information. Banks, realizing the importance of and benefits provided by ESB and SOA, in many instances thereafter created a service layer and developed many services. Unfortunately, however, such solutions oftentimes lacked service governance. Registry products like CentraSite might in some ways help. But because banks oftentimes had many services provided in the ESB that could not be migrated to a SOA registry in a short timeframe, they looked for solution to help create an abstraction layer for all of the infrastructure already present. Heterogeneous read-only federation would help in these situations, e.g., so that these infrastructures could be maintained and integrated.

Certain example embodiments might also be useful when a company or agency wants to host a public registry over many different types of registries. Many NGOs are helping to raise the standard of living in under-developed counties. Technology oftentimes is used to build awareness and in attempts to help the poor make a living by providing people with a means for selling their products (e.g., through microfinance, fair trade, and/or the like). NGOs oftentimes focus in a limited area such as the districts or states in which they work. A governmental organization, macro-NGO, or the like might, however, see benefits in unify these efforts, e.g., by hosting a public registry that mirrors multiple districts' registries, statewide registries, regional registries, supernational registries, etc. Because there may be many registries with potentially unreliable infrastructure, maintaining performance might be important yet challenging where continuous availability might not be guaranteed. A scalable heterogeneous read-only federation built in accordance with certain example embodiments might be of assistance in such situations, e.g., to provide independent services for different registries even though others might be down, to cache requests for registries with interruptions, etc.

It will be appreciated that these scenarios are provided by way of example and that the example embodiments described herein may find practical application in a wide variety of similar and different scenarios.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of maintaining a heterogeneous federation of target registries implementing different protocols, the target registries being separated from at least one client device via a master gateway registry hosted on a computer system including a processor and a memory, the method comprising:

receiving, at the master gateway registry, a request for a service from the at least one client device, the request being in a first format;

translating, using a translation protocol layer at the master gateway registry, the request into translated requests of a plurality of different second formats, the plurality of different second formats being different from the first format and being selected so as to match different protocols natively supported by the target registries;

electronically transmitting, from the master gateway registry, the translated requests to the target registries;

in response to the electronic transmission to the target registries, receiving, at the master gateway registry, responses from the target registries in the one or more second formats;

translating, at the master gateway registry, the responses from the one or more second formats into translated responses in the first format; and electronically transmitting, from the master gateway registry, the translated responses to the at least one client device, wherein translations are performable as between formats supporting ActiveDirectory, UDDI, ebXML, OSGi, ESB, webservice, and/or proprietary protocols, and include selectively generating translations between UDDI protocol based messages and SOAP messages for webservice protocol support.

2. The method of claim 1, wherein the at least one client device is permitted to contact the target registries only indirectly and through the master gateway registry, and vice versa.

3. The method of claim 1, wherein translations are performed at the master gateway registry using the processor of the computer system.

4. The method of claim 1, wherein translations are performed in accordance with configured mappings as between the first format and the plurality of second formats, the mappings being stored to a non-transitory computer readable storage medium accessible by the master gateway registry.

5. The method of claim 4, wherein the mappings are generated as new target registries are added to the federation.

6. The method of claim 4, wherein the mappings specify default parameters to be included in translated requests and/or translated responses.

7. The method of claim 1, further comprising:
receiving, at the master gateway registry, requests for service from a plurality of client devices, the requests being in one or more first formats;
translating the requests into translated requests of second formats, the second formats being different from the one or more first format and being selected so as to match protocols natively supported by the target registries;
translating the responses from the one or more second formats into translated responses in the one or more first formats; and
electronically transmitting, from the master gateway registry, the translated responses to the client devices in formats that match the one or more first formats respectively used by the client devices in sending their requests.

8. The method of claim 1, wherein the target registries are accessible through at least two slave gateway registries that each is in communication with the master gateway registry.

9. The method of claim 8, wherein the at least two slave gateway registries are arranged hierarchically.

10. The method of claim 9, wherein the at least two slave gateway registries are arranged in parallel.

11. The method of claim 9, wherein each said slave gateway registry has a predefined maximum size.

12. The method of claim 11, further comprising adding new target registries into a first slave gateway registry until the first slave gateway registry's maximum size is reached.

13. The method of claim 12, further comprising when the first slave gateway registry's maximum size is reached:
generating a new slave gateway registry;
creating a link between the first slave gateway and the new slave gateway registry; and
treating the new slave gateway registry as the first gateway registry such that new target registries are added therein until its maximum size is reached.

14. The method of claim 9, further comprising load balancing the target registries amongst the slave gateway registries.

15. The method of claim 8, wherein transmission of the translated requests to the target registries is performed via the slave gateway registries.

16. The method of claim 15, wherein each said slave gateway registry simultaneously transmits the translated requests it receives from the master gateway registry and any intervening slave gateway registries simultaneously to each target registry associated therewith.

17. The method of claim 1, further comprising queuing responses on the slave gateway registries until a predetermined amount of time elapses or a predetermined number of responses are generated, whichever comes first, and then transmitting those requests directly or indirectly to the master gateway registry.

18. The method of claim 1, further comprising queuing translated responses on the master gateway registry until a predetermined amount of time elapses or a predetermined number of translated responses are generated, whichever comes first, and then performing the electronic transmission to the at least one client device.

19. A non-transitory computer readable storage medium tangibly storing instructions that, when executed by a processor of a computer system, aid in maintaining a heterogeneous federation of target registries implementing different protocols, the target registries being separated from at least one client device via a master gateway registry that hosts a plurality of translation modules on a computer system including a processor and a memory, the instructions causing the master gateway registry to at least:
receive, at the master gateway registry, a request for a service from the at least one client device, the request being in a first format;
translate the request into translated requests of a plurality of different second formats using the translation modules under the control of the processor, the plurality of different second formats being different from the first format and being selected so as to match protocols natively supported by the target registries;
transmit, from the master gateway registry, the translated requests to the target registries;
receiving, at the master gateway registry, responses from the target registries in the one or more second formats following the transmissions to the target registries;
translate the responses from the one or more second formats into translated responses in the first format using the translation modules under the control of the processor; and
transmit, from the master gateway registry, the translated responses to the at least one client device, wherein translations are performable as between formats supporting ActiveDirectory, UDDI, ebXML, OSGi, ESB, webservice, and/or proprietary protocols, and include selectively generating translations between UDDI protocol based messages and SOAP messages for webservice protocol support.

20. A computer system including a processor, a memory, and a non-transitory computer readable medium, the computer system hosting a master gateway registry configured to at least perform the method according to claim 1.

21. A method of maintaining a heterogeneous federation of target registries implementing different protocols, the target registries being separated from at least one client device via a master gateway registry, the method comprising:
receiving a request to add a new target registry to the federation, the new target registry using a protocol that is different from at least one other target registry in the heterogeneous federation;

identifying parameters of services offered by the new registry that are to be exposed to the at least one client device;

mapping the identified parameters to corresponding parameters exposed through the master gateway registry, the mapping providing instructions as to how messages in a first format for a first protocol usable by the at least one client device are to be translated using a translation protocol in the master gateway registry, into corresponding messages in a second format for a second protocol usable by the new target registry, and vice versa, the first and second formats and/or the first and second protocols being different from one another, wherein the mapping provides instructions for translations to be performable as between formats supporting ActiveDirectory, UDDI, ebXML, OSGi, ESB webservice, and/or proprietary protocols, and for selectively generating translations between UDDI protocol based messages and SOAP messages for webservice protocol support;

storing the mapping to a non-transitory computer readable storage medium;

deploying the new registry in a group of registries based on one or more characteristics associated with the new registry; and enabling the newly deployed registry to begin accepting requests from and serving replies to the at least one client device, through the master gateway registry, in connection with the mapping.

22. The method of claim 21, further comprising receiving input specifying default values for at least some of the identified parameters.

23. The method of claim 21, further comprising identifying the parameters by automatically parsing a WSDL document.

24. The method of claim 21, wherein the identifying includes receiving a WSDL document that exposes parameters, and further comprising implementing a webservice using the WSDL document, which the master gateway registry exposes.

25. The method of claim 21, further comprising building a custom-programmed translation module based on the mapping.

26. The method of claim 21, wherein a plurality of groups are providable in a hierarchical, multi-tiered fashion, as further target registries are added to the federation.

27. A non-transitory computer readable storage medium tangibly storing instructions that, when executed by a processor of a computer system, aid in maintaining a federation of target registries by performing at least the method of claim 21.

28. A computer system including a processor, a memory, and a non-transitory computer readable medium, the computer system being configured to execute computer functions for accomplishing at least the method of claim 21.

* * * * *